United States Patent
Asano

(10) Patent No.: US 8,111,719 B2
(45) Date of Patent: Feb. 7, 2012

(54) TRANSMISSION SYSTEM

(75) Inventor: Hiroyuki Asano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 345 days.

(21) Appl. No.: 12/548,932

(22) Filed: Aug. 27, 2009

(65) Prior Publication Data
US 2010/0054232 A1    Mar. 4, 2010

(30) Foreign Application Priority Data
Sep. 2, 2008  (JP) ................. 2008-224399

(51) Int. Cl.
*H04B 14/00*  (2006.01)

(52) U.S. Cl. ....................... 370/503; 375/357

(58) Field of Classification Search ............ 370/503, 370/522; 375/357
See application file for complete search history.

(56) References Cited

U.S. PATENT DOCUMENTS

| 7,990,909 B2 * | 8/2011 | Brueckheimer | 370/324 |
| 2007/0133724 A1 * | 6/2007 | Mazereeuw et al. | 375/354 |
| 2010/0118894 A1 * | 5/2010 | Aweya et al. | 370/503 |

FOREIGN PATENT DOCUMENTS

JP    2006-157361 A    6/2009

* cited by examiner

*Primary Examiner* — Melvin Marcelo
(74) *Attorney, Agent, or Firm* — Westerman, Hattori, Daniels & Adrian, LLP

(57) ABSTRACT

A transmission system includes: a transmission-side device that has a transmission-side clock generation unit that generates a first clock signal on the basis of a reference clock signal; a clock extraction unit that removes a data clock signal superimposed with transmission data to a reception-side device; a clock difference acquisition unit that determines a difference between the first clock signal and the data clock signal; and a packet generation unit that packetizes the information on the difference determined by the clock difference acquisition unit; and the reception-side device that has a reception-side clock generation unit that generates a second clock signal on the basis of the reference clock; a packet reception unit that receives the information on the packetized difference from the transmission-side device; and a data clock regeneration unit that regenerates the data clock signal on the basis of the second clock signal and the difference information.

8 Claims, 7 Drawing Sheets

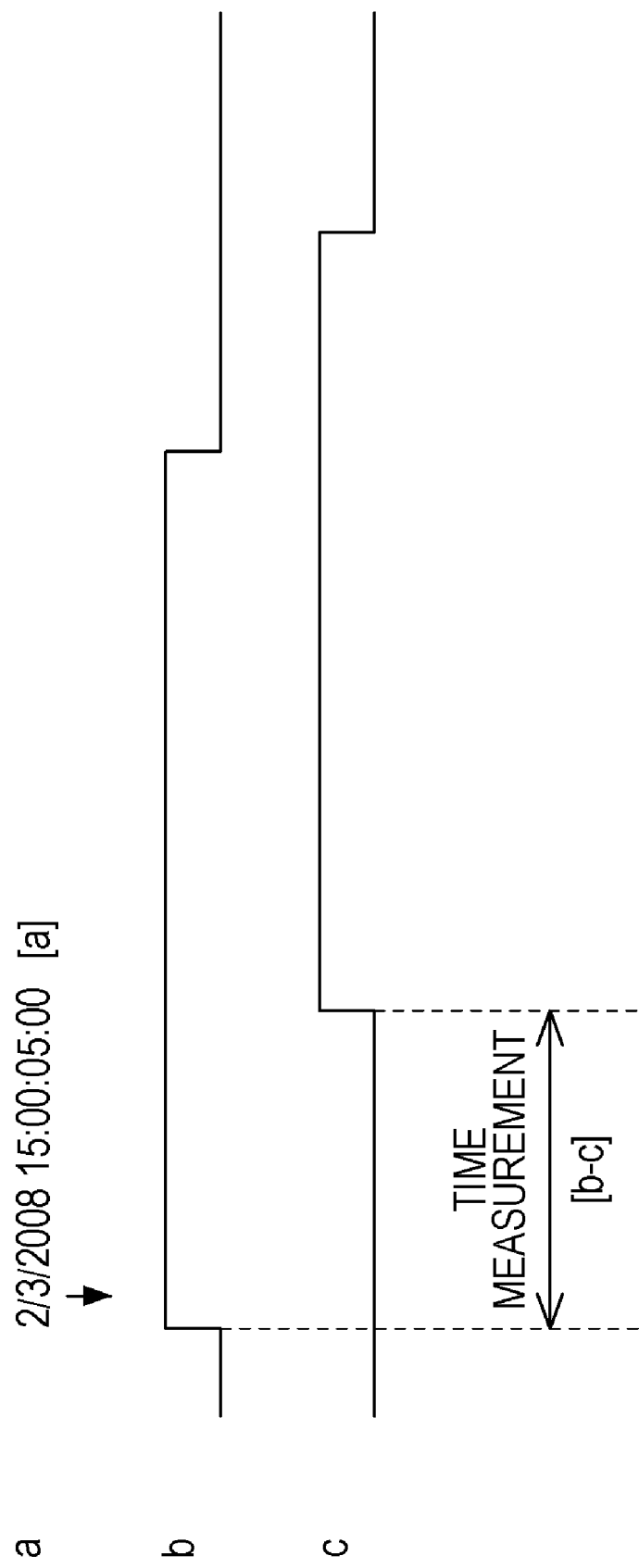

TRANSMISSION SYSTEM

CROSS-REFERENCE TO RELATED APPLICATION

This application is based upon and claims the benefit of priority from the prior Japanese Patent Application No. 2008-224399 filed on Sep. 2, 2008, the entire contents of which are incorporated herein by reference.

BACKGROUND

1. Field

The present invention relates to a transmission system having a transmission-side device transmitting data, and a reception-side device receiving the data from the transmission-side device.

2. Description of Related Art

Recently, in order to achieve efficiency improvement in networks, such as cost reduction and increase in communication speed, there is a growing tendency toward converting conventional networks into IP (Internet protocol)-based networks. Thus, the conventional TDM (time division multiplex) typified by SONET (synchronous optical network)/SDH (synchronous digital hierarchy) is being shifted to the IP. Under such an environment, there occurs the need for accommodating the conventional TDM network in a new IP network. In this case, a TDM signal is packetized on the transmission side, and after having been transmitted via the IP network, it is regenerated on the reception side. At this time, however, the regeneration of a clock signal poses a problem.

The cellification of TDM signal has been implemented by an AAL1-based circuit emulation technique, in conformity with ATM (asynchronous transfer mode). Because the ATM is constituted of a cell having a fixed and short data length, it has been little affected by delay or jitter, thereby allowing clock regeneration to be comparatively easily performed. On the other hand, the technology for implementing the IP-packetization of a TDM signal is generally referred to as "pseudo wire" or "PWE3" (pseudo wire emulation edge to edge). The IP packet has a non-fixed and variable length; in recent years, a jumbo IP packet (up to 9600 bytes) has made its market debut. In the IP packet, a variety of pieces of data are mixed, and thus QoS (quality of service) control with respect to the network is insufficient, so that packet arrival intervals on the reception side considerably vary. A typical clock regeneration method on the reception side is to regenerate a clock upon having checked the amount of received data. However, if arrival intervals of received packets vary, jitter becomes large, so that a regenerated clock may differ from the clock on the transmission side. In particular, in the event that packet is lost, the clocks on the transmission and reception sides may significantly deviate from each other.

A technique for matching sampling frequencies on the transmission side and the reception side in a transmission system, is disclosed in, for example, Japanese Unexamined Patent Application Publication No. 2006-157361.

SUMMARY

According to an embodiment of the present invention, a transmission-side device that has a transmission-side clock generation unit that generates a first clock signal on the basis of a reference clock signal; a clock extraction unit that takes out a data clock signal superimposed with transmission data to a reception-side device; a clock difference acquisition unit that determines a difference between the first clock signal and the data clock signal; and a packet generation unit that packetizes the information on the difference determined by the clock difference acquisition unit; and the reception-side device that has a reception-side clock generation unit that generates a second clock signal on the basis of the reference clock signal; a packet reception unit that receives the information on the packetized difference from the transmission-side device; and a data clock regeneration unit that regenerates the data clock signal on the basis of the second clock signal and the difference information.

It is to be understood that both the foregoing summary description and the following detailed description are explanatory as to some embodiments of the present invention, and not restrictive of the present invention as claimed.

BRIEF DESCRIPTION OF THE DRAWINGS

FIG. 7 illustrates an example of operation of the reception-side communications device according to the embodiment of the present invention.

DETAILED DESCRIPTION OF EXAMPLE EMBODIMENTS

Hereinafter, a preferred embodiment according to the present invention will be described with reference to the appended drawings.

Figure 1:
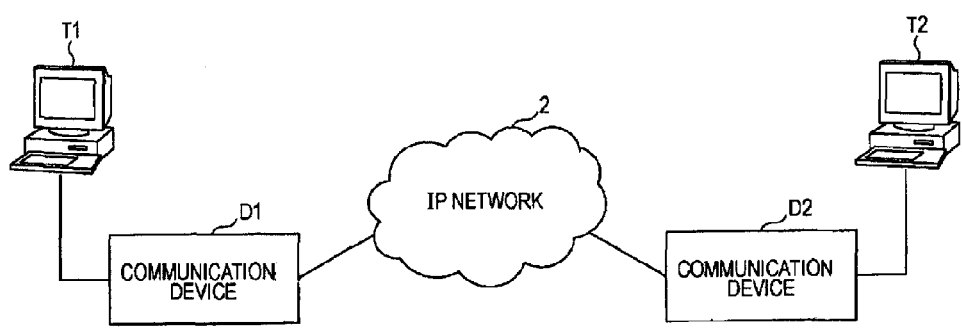
FIG. 1 schematically illustrates an example of configuration of a transmission system according to an embodiment of the present invention.

FIG. 1 schematically illustrates an example of configuration of a transmission system according to an embodiment of the present invention. The transmission system 1 in FIG. 1 has terminals T1 and T2 connected to each other via an IP network 2. The terminals T1 and T2, respectively, have communications devices D1 and D2 for exchanging data via the IP network 2 therebetween. Although in FIG. 1, the communications devices D1 and D2 respectively, are disposed on the outside of the terminals T1 and T2, they may be incorporated in the terminals T1 and T2, respectively. Moreover, in FIG. 1, only the two terminals T1 and T2 are illustrated for the sake of simplicity, but in actuality, more terminals may be connected to one another via the IP network 2.

For example, data generated in the terminal T1 is packetized by the communications device D1, and transmitted to the terminals T2 via the IP network 2. The terminal T2 receives data that has been returned from a packet format to the original format (e.g., TDM signal). The same goes for the case wherein data is returned from the terminals T2 to the terminal T1 in an opposite manner.

Figure 2:
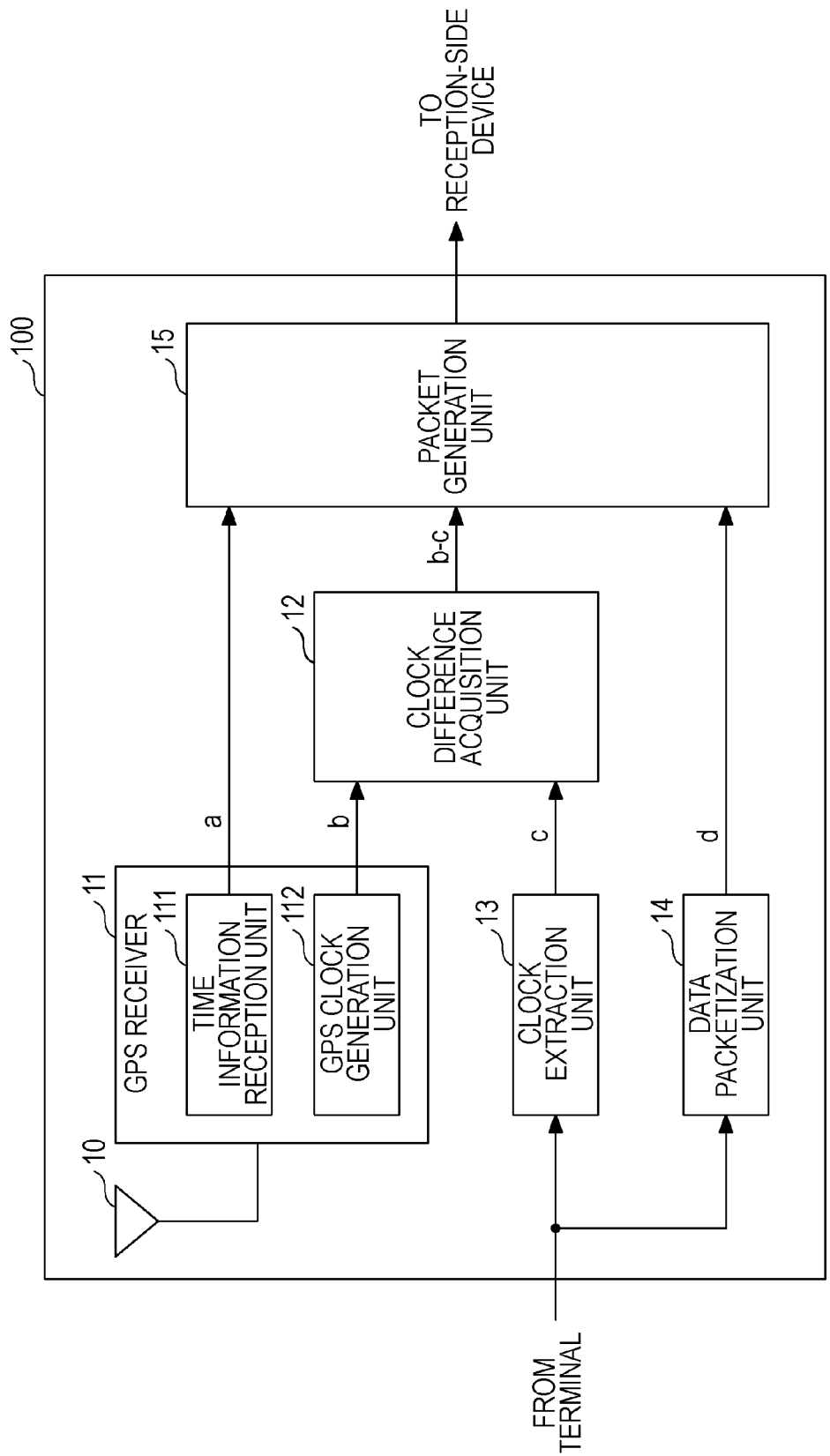
FIG. 2 illustrates an example of configuration of a transmission-side communications device according to the embodiment of the present invention.

FIG. 2 illustrates an example of configuration of a transmission-side communications device according to the embodiment of the present invention. The transmission-side communications device 100 in FIG. 2 includes a GPS (global positioning system) antenna 10, a GPS receiver 11, a clock difference acquisition unit 12, a clock extraction unit 13, a data packetization unit 14, and a packet generation unit 15.

The GPS receiver 11 can receive radio waves from a GPS satellite via the GPS antenna 10. The GPS receiver 11 includes a time information reception unit 111, and a GPS clock generation unit 112 generating a sampling clock signal with a predetermined frequency, on the basis of a reference clock signal included in radio waves from the GPS satellite. The GPS clock generation unit 112 can generate the predetermined frequency using, for example, a PLL (phase locked loop) circuit.

The clock extraction unit 13 can separate and remove a clock signal superimposed/overlapping with a TDM signal including data generated by a terminal (for example, the terminal T1 or T2 in FIG. 1). In general, the clock extraction unit 13 is also referred to as CDR (clock data recovery). The clock difference acquisition unit 12 can determine a difference (b-c) between a GPS clock "b" generated by the GPS receiver 11, and a TDM clock "c" removed by the clock extraction unit 13.

The data packetization unit 14 can extract, from the TDM signal, the main data except for the clock separated from the TDM signal by the clock extraction unit 13, to perform packetization so as to allow the main data to be transmitted via the IP network.

The packet generation unit 15 can generate an IP packet to be transmitted to the reception-side device. The IP packet is generated by adding the information indicating a difference (b-c) (hereinafter, referred to as difference information) determined by the clock difference acquisition unit 12, and time information "a" received at a point in time when the difference information has been determined, to a data packet "d" generated by the data packetization unit 14. Alternatively, without adding the difference information (b-c) and the time information "a" to the data packet "d", the packet generation unit may generate an IP packet as a clock packet indicating a point in time when the data packet "d" has been generated and a clock of a TDM signal, from the above-described difference information (b-c) and time information "a".

The IP packet generated by the packet generation unit 15 is transmitted to the reception-side device by a transmission unit (not shown) provided at the output of the communications device on the transmission-side.

FIGS. 3A and 3B illustrate an example of configuration of the IP packet according to the embodiment of the present invention. FIG. 3A illustrates the configuration of the IP packet generated by adding the difference information (b-c) and the time information "a" indicating the point in time when the difference information (b-c) has been determined, to the data packet "d" generated by the data packetization unit 14. This IP packet includes the time information "a", the clock difference information (b-c), and the data packet "d", between an IP header located at the forefront of the IP packet and an FCS (frame check sequence) located at the tail end thereof. On the other hand, FIG. 3B illustrates the configuration of the IP packet generated as a clock packet, from the clock difference information (b-c) and the time information "a". This IP packet includes the time information "a" and the clock difference information (b-c) between the IP header at the forefront of the IP packet and the FCS at the tail end thereof, but includes no data packet "d", which is main data obtained by packetizing the TDM signal. In this case, the data packet "d" is separately transmitted.

Figure 4:
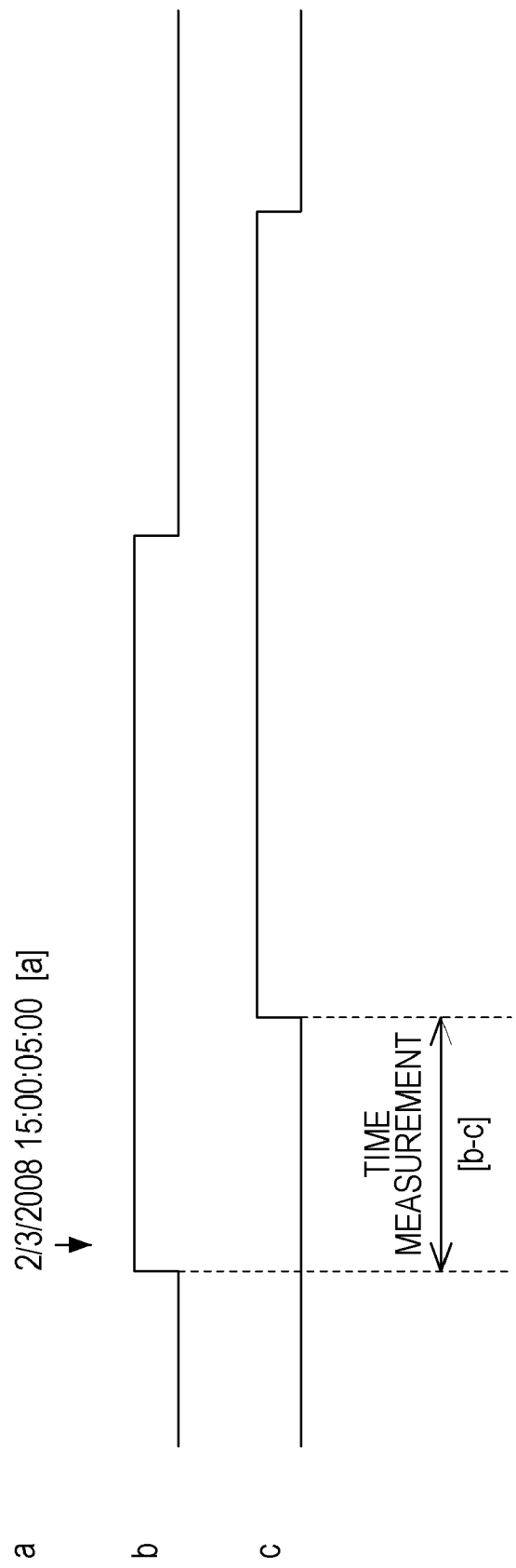
FIG. 4 illustrates an example of operation of the transmission-side communications device according to the embodiment of the present invention.

FIG. 4 illustrates an example of operation of the transmission-side communications device according to the embodiment of the present invention. In FIG. 4, the time information "a" received by the GPS receiver 11, the GPS clock "b" generated by the GPS receiver 11, and the TDM clock "c" removed by the clock extraction unit 13 are represented in this order from above.

The time information "a" indicates a time-of-day at the point in time when the difference information (b-c) has been determined by the clock difference acquisition unit 12, and is herein assumed to indicate, for example, 15:00:05 Feb. 3, 2008. The GPS clock "b" is a sampling clock with a predetermined frequency, being generated by the GPS clock generation unit 112 on the basis of the reference clock included in the radio waves from the GPS satellite, and is herein assumed to be, for example, an 8 kHz pulse. The TDM clock "c" is a clock component taken out by the clock extraction unit 13, from the TDM signal including data generated in the terminal, and is herein assumed to be, for example, an 8 kHz pulse, as well.

The clock difference acquisition unit 12 can measure a time period from a rise of the GPS clock "b" to a rise of the TDM clock "c" by sampling jitter with a high-speed clock operating at a high speed within an allowable range. In this way, the time measured by the clock difference acquisition unit 12 is output as the difference information (b-c). The clock difference acquisition unit 12 can implement the high-speed clock for sampling by using a high-stability TCXO (temperature-compensated crystal oscillator). According to the high-stability TCXO, frequency stability better than ±0.3 ppm can be achieved.

Figure 3:
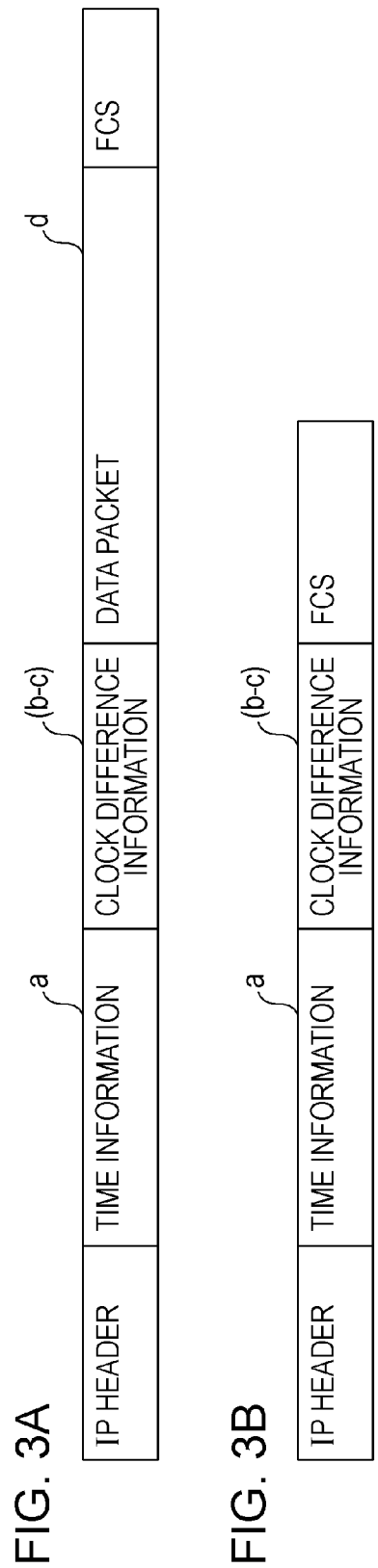
FIGS. 3A and 3B each illustrate an example of configuration of an IP packet according to the embodiment of the present invention.

As described by reference to FIGS. 2 to 4, the communications device on the transmission-side, when packetizing the TDM signal, can generate an IP packet by adding the pertinent time and frequency (clock) information on the TDM signal. Furthermore, the transmission-side communications device calculates the frequency information on the TDM signal by comparing it with the reference clock signal of the GPS. The GPS clock signal generally has a clock accuracy better than $1 \times 10^{-12}$ seconds.

Figure 5:
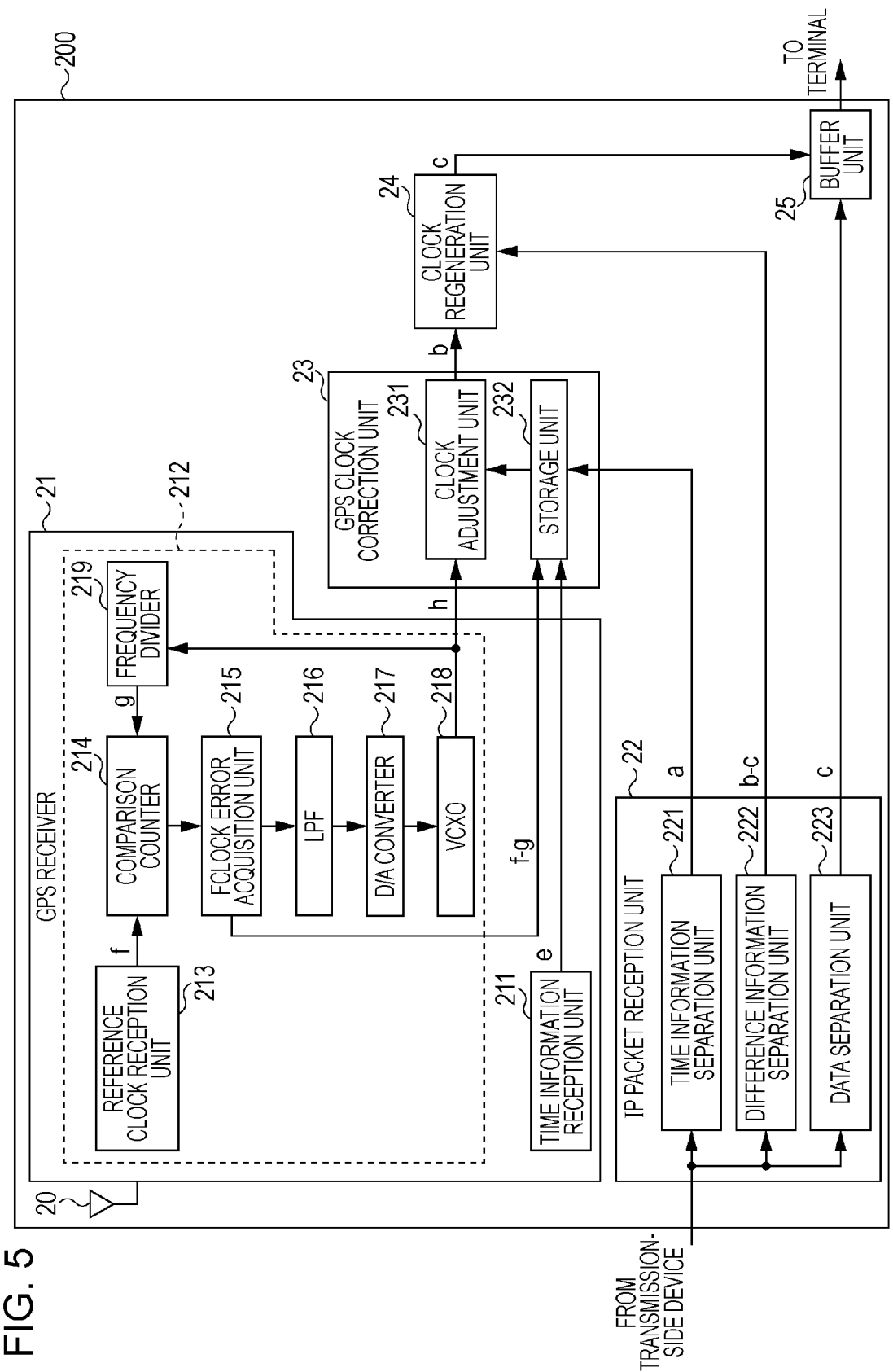
FIG. 5 illustrates an example of configuration of a reception-side communications device according to the embodiment of the present invention.

FIG. 5 illustrates an example of a configuration of a reception-side communications device according to the embodiment of the present invention. A reception-side device 200 in FIG. 5 includes a GPS antenna 20, a GPS receiver 21, an IP packet reception unit 22, a GPS clock correction unit 23, a clock regeneration unit 24, and a buffer unit 25.

The GPS receiver 21 can receive radio waves from the GPS satellite via the GPS antenna 20. The GPS receiver 21 includes a time information reception unit 211 receiving the time information included in the radio waves from the GPS satellite, and a GPS clock generation unit 212 generating a sampling clock with a predetermined frequency, on the basis of the reference clock included in the radio waves from the GPS satellite.

The GPS clock generation unit 212 can generate the predetermined frequency using, for example, a PLL (phase locked loop) circuit. Specifically, the GPS clock generation unit 212 includes a reference clock reception unit 213, a comparison counter 214, a clock error acquisition unit 215, a digital low-pass filter (LPF) 216, a digital/analog (D/A) converter 217, and a VCXO (voltage controlled crystal oscillator) 218, and a frequency divider 219. The reference clock reception unit 213 can receive the reference clock "f" included in radio waved from the GPS satellite. The comparison counter 214 can compare phases between the reference clock "f" received by the reference clock reception unit 213 and an output signal "g" of the PLL circuit. From the comparison result obtained by the GPS clock generation unit 212, the clock error acquisition unit 215 can acquire a frequency error of the out signal "g" relative to the reference clock "f", i.e., (f-g). This frequency error, after having been passed through the LPF 216, is converted into an analog voltage by the D/A converter 217. The VCXO 218 outputs a signal having a frequency corresponding to the analog voltage converted by the D/A converter 217. The frequency divider 219 divides the frequency of the output signal "h" of the VCXO 218, and supplies it to the comparison counter 214. The output signal "h" of the VCXO 218 is also output from the GPS clock generation unit 212, as a GPS clock with the predetermined frequency.

The IP packet reception unit 22 can receive an IP packet transmitted from the transmission-side device via the IP network. The IP packet reception unit 22 includes a time information separation unit 221, a difference information separation unit 222, and a data separation unit 223, respectively, separating the time information "a", the difference information (b-c), and the data packet "d", respectively.

The GPS clock correction unit 23 can correct the GPS clock "h" generated by the GPS receiver 21 so as to coincide with the GPS clock "b" in the point in time when the GPS clock (b-c) has been determined by the transmission-side device. The GPS clock correction unit 23 includes a clock adjustment unit 231 and a storage unit 232. The storage unit 232 can store, every unit time, the frequency error (f-g) acquired by the clock error acquisition unit 215 in the GPS receiver 21, associating with time information "e" received by the time information reception unit 211. The clock adjustment unit 231 reads, from the storage unit 232, the frequency error [f-g] from the time when the difference information (b-c) has been determined by the transmission-side device up to the time when an IP packet has been received by the reception-side device, on the basis of the time information "a" separated from the received IP packet by the time information separation unit 221. The clock adjustment unit 231 can correct the GPS clock "h" generated by the GPS receiver 21 using the frequency error [f-g] that has been read. Alternatively, the GPS clock correction unit 23 may be omitted, because disturbance of the GPS clock hardly occurs and hence the difference in the clock time between before and after the correction can be assumed to be substantially zero. Moreover, the storage unit 232 may be a memory (not shown) within the GPS receiver 21.

The clock regeneration unit 24 can regenerate the TDM clock "c", on the basis of the GPS clock "b" after correction by the GPS clock correction unit 23, and the difference information (b-c) separated from the received IP packet by the difference information separation unit 222.

The buffer unit 25 can temporarily store the data packet "d" separated from the received IP packet by the data separation unit. The data packet "d" is sent from the buffer unit 25 to the terminal (for example, the terminal T1 or T2 in FIG. 1) in accordance with the TDM clock "c" regenerated by the clock regeneration unit 24. By this processing, the TDM data in synchronization with the TDM clock is regenerated from the received packet. That is, the buffer unit 25 functions as a data regeneration unit. The buffer unit 25 may be, for example, an FIFO (first in first out) memory.

Figure 6:
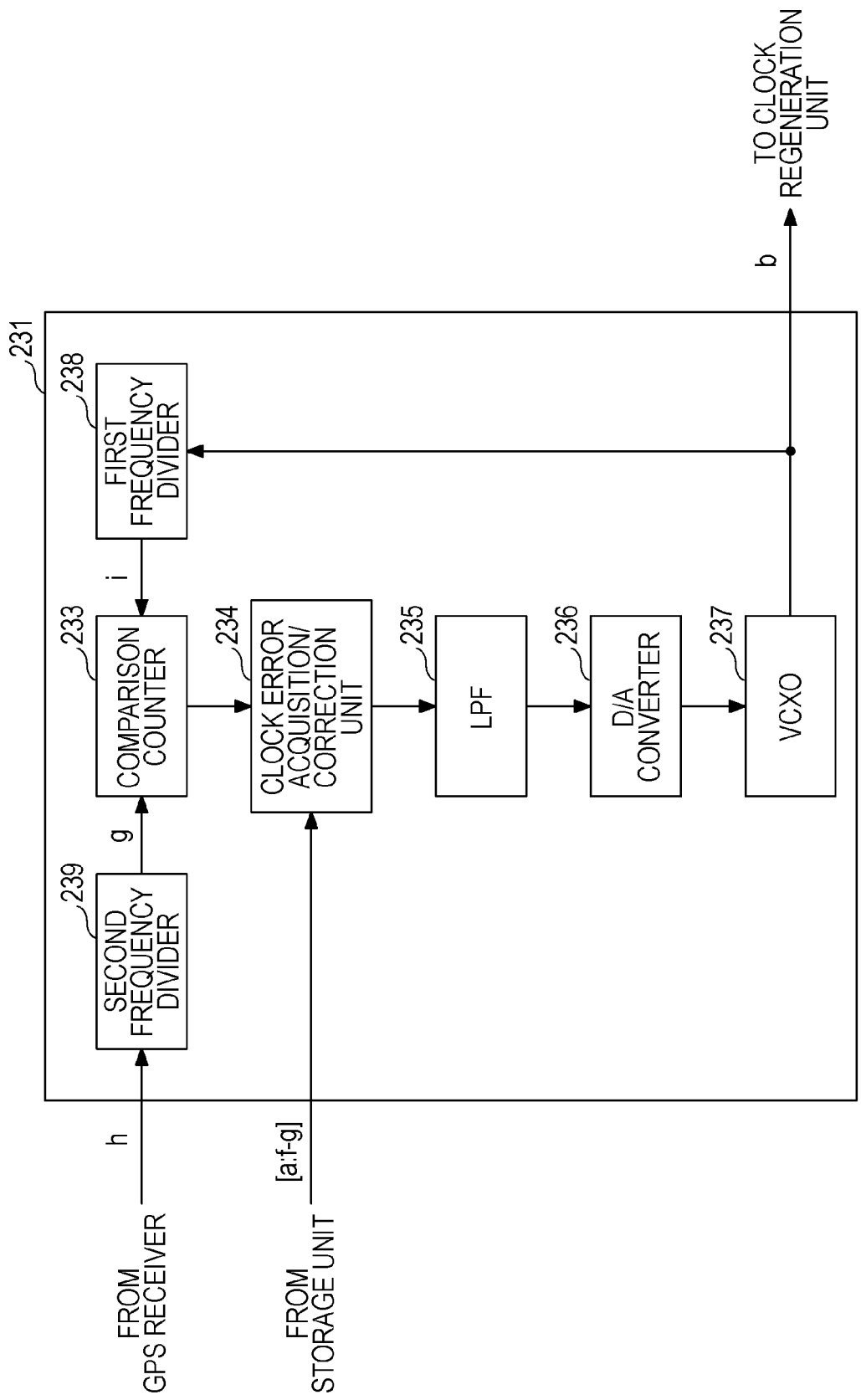
FIG. 6 illustrates an example of configuration of a clock adjustment unit according to the embodiment of the present invention.

FIG. 6 illustrates an example of a configuration of a clock adjustment unit according to the embodiment of the present invention. The clock adjustment unit 231 in FIG. 6 includes a comparison counter 233, a clock error acquisition/correction unit 234, a digital LPF 235, a D/A converter 236, a VCXO 237, a first frequency divider 238, and a second frequency divider 239.

The second frequency divider 239 can divide the frequency of the GPS clock "h" generated by the GPS receiver 21. The second frequency divider 239 has the same characteristic as that of the frequency divider 219 used in the GPS clock generation unit 212 in the GPS receiver 21, and can divide the frequency of an input signal into N parts (N: a positive integer). The output signal of the second frequency divider 239, therefore, is the signal g as in the case of the frequency divider 219 in the GPS clock generation unit 212.

The comparison counter 233 can compare phases between the output signal "g" of the second frequency divider 239 and the output signal "i" of the first frequency divider 238. From the comparison result obtained by the comparison counter 233, the clock error acquisition/correction unit 234 can acquire a frequency error (g-i) between the signals "g" and "i". Furthermore, the clock error acquisition/correction unit 234 can read, from the storage unit 232, a frequency error [f-g] from the time when the difference information (b-c) has been determined by the transmission-side device up to the time when an IP packet has been received by the reception-side device. The clock error acquisition/correction unit 234 corrects the frequency error (g-i) so that the GPS clock "b" at the point in time when the difference information (b-c) has been determined by the transmission-side device can be obtained, on the basis of the frequency error [f-g] that has been read from the storage unit 232.

This frequency error after the correction, after having been passed through the LPF 235, is converted into an analog voltage by the D/A converter 236. The VCXO 237 outputs a signal having a frequency corresponding to the analog voltage converted by the D/A converter 236. The first frequency divider 238 divides the frequency of the output signal "b" of the VCXO 237, and supplies it to the comparison counter 233. The output signal "b" of the VCXO 237 is also output from the GPS clock correction unit 23, as a GPS clock "b" after correction.

FIG. 7 illustrates an example of operation of the reception-side communications device according to the embodiment of the present invention. In FIG. 7, the time information "a" indicating the point in time when the clock difference information (b-c) has been acquired by the transmission-side device, the GPS clock "b", and the TDM clock "c" are represented in this order from above.

The time information "a" can be separated from a received IP packet, by the time information separation unit 221, and indicates a time-of-day at the point in time when the difference information (b-c) has been determined, that is, 15:00:05 Feb. 3, 2008. The GPS clock "b" is an 8 kHz pulse, which is obtained by correcting the output signal "g" generated in the GPS receiver 21, by the GPS clock correction unit 23, on the basis of the time information "a". The TDM clock "c" is also an 8 kHz pulse, which is obtained by the clock regeneration unit 24, on the basis of the GPS clock "b" after correction by the GPS clock correction unit 23, and the difference information (b-c) separated from the received IP packet, by the difference information separation unit 222.

The clock regeneration unit 24 can regenerate the TDM clock "c" by counting the difference (b-c) from the rise of the GPS clock "b" using the same high-speed clock as that in the transmission-side device. The clock regeneration unit 24 can implement a high-speed clock using a high-stability TCXO as in the case of the transmission-side device.

As described by reference to FIGS. 5 to 7, the communications device on the reception-side has time information in synchronization with that of the communications device on the transmission-side. The communications device on the reception-side can obtain, from the IP packet received from the transmission side, the difference information and the time when the difference information has been acquired, that is, frequency information on the TDM signal and the time when the TDM signal has been packetized. On the basis of these pieces of information, the communications device on the reception-side can regenerate clock of the TDM signal with high accuracy. Furthermore, the communications device on the reception-side can compensate for variations in the GPS reference clock between the time when the TDM signal has been packetized on the transmission side and the time when the IP packet has been received on the reception side.

As described above, the transmission system according to the present embodiment can regenerate transmission-side clocks on the reception side with high accuracy, through the use of the GPS. In principle, in the clock regeneration on the reception side, jitter other than the reference clock of the GPS does not occur. Furthermore, according to the present embodiment, the GPS receiver is implemented as LSI, and hence it is very inexpensive, which allows a low-cost and high-accuracy system to be built.

While the present invention has been described in its preferred embodiment, the invention is not limited thereto but may otherwise variously embodied without departing from the spirit and scope of the invention.

The embodiment described above is a preferred embodiment. The present invention is not limited to this but various modifications can be made without departing from the spirit of the present invention. All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. A transmission system comprising:
   a transmission-side device that transmits data; and
   a reception-side device that receives the data from the transmission-side device,
   wherein the transmission-side device comprises:
      a transmission-side clock generation unit that generates a first clock signal with a predetermined frequency, on the basis of a reference clock signal included in a radio wave from a GPS satellite;
      a clock extraction unit that removes a data clock signal, superimposed with transmission data, to be transmitted to the reception-side device;
      a clock difference acquisition unit that determines a difference between the first clock signal and data clock signal;
      a packet generation unit that packetizes the information on the difference determined by the clock difference acquisition unit;
   wherein the reception-side device comprises:
      a reception-side clock generation unit that generates a second clock signal with a predetermined frequency, on the basis of the reference clock signal included in a radio wave from the GPS satellite;
      a packet reception unit that receives the information on the difference packetized by the packet generation unit, from the transmission-side device; and
      a data clock regeneration unit that regenerates the data clock on the basis of the second clock signal and the difference information determined by the clock difference acquisition unit.

2. The transmission system according to claim 1, further comprising:
   a time information reception unit that receives time information included in a radio wave from the GPS satellite,
   wherein, in the transmission-side device, the packet generation unit packetizes the difference information, and the time information indicates a point in time when the difference information has been determined by the clock difference acquisition unit;
   wherein the reception-side device further comprises:
      an information separation unit that separates and removes the difference information and the time information from the packet received by the packet reception unit; and
      a clock correction unit that, on the basis of the time information removes by the information separation unit, corrects the second clock signal generated by the reception-side clock generation unit so that it coincides with the first clock signal generated by the transmission-side clock generation unit at the point in time when the difference has been determined by the clock difference acquisition unit in the transmission-side device.

3. The transmission system according to claim 2, wherein the clock correction unit has a storage unit that stores a temporal change of the second clock signal generated by the reception-side clock generation unit.

4. The transmission system according to claim 1, wherein the packet generation unit packetizes the transmission data, and generates a packet with the information of the difference added.

5. The transmission system according to claim 1, wherein the transmission-side clock generation unit has a PLL circuit.

6. The transmission system according to claim 1, wherein the reception-side clock generation unit has a PLL circuit.

7. The transmission system according to claim 1, wherein the clock extraction unit removes the data clock signal which is superimposed with time division multiplex data to be transmitted.

8. A transmission system comprising:
   a transmission-side device that transmits time division multiplex communication data by a packet communication; and
   a packet reception-side device that receives the data transmitted from the transmission-side device,
   wherein the transmission-side device comprises:
      a transmission-side clock generation unit that generates a first clock signal with a predetermined frequency, on the basis of a reference clock signal included in a radio wave from a GPS satellite;
      a clock extraction unit that removes a data clock signal which is superimposed with time division multiplex data to be transmitted;
      a main data extraction unit that extracts main data of the time division multiplex data to be transmitted;
      a clock difference acquisition unit that determines a difference between the first clock signal and the data clock signal;
      a packet generation unit that packetizes the main data extracted by the main data extraction unit, and that is superimposed with the difference information deter mined by the clock difference acquisition unit, with the packet; and a transmission unit that transmits the packet generated by the packet generation unit, to the packet reception-side device;

wherein the packet reception-side device comprises:

a reception-side clock generation unit that generates a second clock signal with a predetermined frequency, on the basis of the reference clock signal included in a radio wave from the GPS satellite;

a packet reception unit that receives the packet transmitted from the transmission-side device;

a difference information separation unit that separates and removes the difference information packetized by the packet generation unit, from the packet received by the packet reception unit;

a data clock regeneration unit that regenerates the data clock signal, on the basis of the second clock signal generated by the reception-side clock generation unit, and the difference information removed by the difference information separation unit; and a data regeneration unit that regenerates the time division multiplex data from the packet received by the reception unit, on the basis of the data clock signal being regenerated by the data clock regeneration unit.

\* \* \* \* \*